United States Patent
Mansour et al.

(10) Patent No.: US 12,511,348 B2
(45) Date of Patent: Dec. 30, 2025

(54) METHOD FOR IMPLEMENTING RADIO TOPOLOGY RECOMMENDER SYSTEMS

(71) Applicant: Telefonaktiebolaget LM Ericsson (publ), Stockholm (SE)

(72) Inventors: Mario Mansour, Åkersberga (SE); Gabriel Hjort Akerlund, Vallentuna (SE); Andreas Ermedahl, Spånga (SE); Per Karlsson, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/703,854

(22) PCT Filed: Oct. 26, 2021

(86) PCT No.: PCT/IB2021/059905
§ 371 (c)(1),
(2) Date: Apr. 23, 2024

(87) PCT Pub. No.: WO2023/073401
PCT Pub. Date: May 4, 2023

(65) Prior Publication Data
US 2024/0419763 A1  Dec. 19, 2024

(51) Int. Cl.
*G06F 16/00* (2019.01)
*G06F 17/18* (2006.01)
(Continued)

(52) U.S. Cl.
CPC ........... *G06F 18/232* (2023.01); *G06F 17/18* (2013.01); *H04L 41/0823* (2013.01); *H04L 41/145* (2013.01); *H04W 24/02* (2013.01)

(58) Field of Classification Search
CPC ................. G06F 18/232; H04L 41/0823
See application file for complete search history.

(56) References Cited

U.S. PATENT DOCUMENTS

2014/0258187 A1* 9/2014 Suleiman ............ G06F 11/3447
706/12
2020/0218990 A1* 7/2020 Li ............................ G06N 5/02
(Continued)

FOREIGN PATENT DOCUMENTS

WO    2019155511 A1    8/2019

OTHER PUBLICATIONS

International Search Report and Written Opinion in PCT/IB2021/059905 mailed Aug. 2, 2022, 10 pages.
(Continued)

*Primary Examiner* — Cheryl Lewis
(74) *Attorney, Agent, or Firm* — Rothwell, Figg, Ernst & Manbeck, P.C.

(57) ABSTRACT

In one aspect, a computer-implemented method for recommending an optimal configuration for a target system is provided. The method includes obtaining a plurality of samples, wherein each sample corresponds to a system configuration. The method includes extracting, from each of the plurality of samples, a plurality of features. The method includes grouping the plurality of samples into one or more clusters, wherein each cluster comprises a set of one or more samples. The method includes calculating, for each respective cluster of the one or more clusters, one or more metrics for each extracted feature based on the set of one or more samples in the respective cluster. The method includes calculating, for each respective cluster of the one or more clusters, a weight for each extracted feature based on the calculated one or more metrics for each extracted feature. The method includes obtaining a set of one or more requirements for a target system. The method includes determining an optimal configuration for the target system based on the calculated weights for each cluster and the set of one or more requirements.

20 Claims, 7 Drawing Sheets

(51) Int. Cl.
*G06F 18/232* (2023.01)
*H04L 41/0823* (2022.01)
*H04L 41/14* (2022.01)
*H04W 24/02* (2009.01)

(56) References Cited

U.S. PATENT DOCUMENTS

2024/0098569 A1* 3/2024 Keshavarz Hedayati ..................
H04W 24/04
2024/0273400 A1* 8/2024 Boué ................... G06N 3/0985

OTHER PUBLICATIONS

Michele Lombardi and Michela Milano, "Boosting Combinatorial Problem Modeling with Machine Learning." arXiv:1807.05517v1. 2018, 8 pages.
Stuart P. Lloyd, "Least Square Quantization in PCM" (1982). IEEE Transactions on Information Theory. 28(2): 129-137.
Keinosuke Fukunaga and Larry D. Hostetler, "The Estimation of the Gradient of a Density Function, with Applications in Pattern Recognition" (1975). IEEE Transactions on Information Theory. 21 (1): 32-40.
Martin Ester, et al., "A Density-based Algorithm for Discovering Clusters in Large Spatial Databases with Noise" (1996). Proceedings of the 2nd International Conference on Knowledge Discovery and Data Mining (KDD-96). AAAI Press, 6 pages.
N. Salhab, et al., "Throughput-Aware RRHs Clustering in Cloud Radio Access Networks", 2018 Global Information Infrastructure and Networking Symposium (GIIS), IEEE, Oct. 23, 2018 (Oct. 23, 2018), pp. 1-5 [from EISR].

* cited by examiner

METHOD FOR IMPLEMENTING RADIO TOPOLOGY RECOMMENDER SYSTEMS

CROSS REFERENCE TO RELATED APPLICATION(S)

This application is a 35 U.S.C. § 371 National Stage of International Patent Application No. PCT/IB2021/059905, filed Oct. 26, 2021, designating the United States, the disclosure of which is incorporated herein by reference in its entirety.

TECHNICAL FIELD

Disclosed are embodiments related to implementing radio topology recommender systems. Certain embodiments relate to radio topology, recommender systems, clustering, modeling, operations research, combinatorial optimization, radio configuration, objective functions, and machine learning.

INTRODUCTION

A radio access network typically consists of multiple sites. Each site configuration consists of a sets of baseband units, radio units, and their interconnect. There exist many possible ways to realize a site configuration, or a radio topology (RT), solution. Finding the optimal RT solution is a complex and difficult task, and can be assisted by the use of RT solvers.

When producing site configuration solutions for an operator, current RT solvers commonly use an objective function to generate optimal solutions. The notion of optimality, however, is typically different across operators. For example, one operator may prefer to minimize the number of components for a site configuration while another operator may prefer homogeneity at the cost of additional hardware. These preferences may be referred to as features hereafter. Hence the objective function needs to be tuned to the preferred features of each operator.

An objective function $f$ is commonly implemented as a weighted sum of features measured in the solution:

$$f = \sum_i x_i * w_i$$

In the objective function, $x_i$ denotes the value of a given feature $X_i$ in the solution and $w_i$ denotes the weight assigned to feature i. If we assume that an operator O prefers solutions with a set $X_O$ of features, then the optimal solution for O is a solution that minimizes $f$ for which $w_i$, $X_i \in X_O$, are assigned relatively large values and $w_i$, $X_i \notin X_O$ are assigned relatively small values.

However, it is typically unclear what the exact values assigned to these weights should be—even to the operators themselves—thereby necessitating the need for learning these weights in a systematic manner. Moreover, the objective function should penalize deviations from the desired values for the preferred features $X_i \in X_O$.

Reference [1] describes a method for learning objective functions and constraints from previous observations in order to tune trajectories, and Reference [2] describes applying machine learning to learn objective functions and then inserting such functions into existing optimization models.

SUMMARY

As described above, current RT solvers use an objective function to find optimal solutions. This approach, however, requires tuning of the objective function weights for every new site configuration. This tuning requires extensive domain knowledge, and therefore automated methods are not trivial to implement. The realization of RT solutions is in many cases done manually and re-done for every new deployment.

The method described in Reference [1] is primarily concerned with model predictive control (MPC) problems, and therefore cannot be readily applied to tuning RT solutions. For example, in MPC the goal is to control an actuator such that its path deviates as little as possible from a predefined trajectory. In radio site configuration, the problem is to, given a set of cells, select a certain number and type of radio and baseband units and connect these in a topology such that the system can serve the set of cells without exceeding compute and network capacity.

Reference [2] mentions that machine learning can be applied for learning objective functions but does not discuss in any detail how this can be realized in practice.

According to some embodiments, techniques are provided herein to implement RT recommender systems. In some embodiments, objective function weights are automatically computed for new RT solutions by learning from earlier deployments.

While some embodiments disclosed herein relate to the context of RT solutions, the techniques disclosed herein can be applied to other types of system tuning and optimization where parameters can be learned from previous solutions. Other types of system tuning and optimization may include, for example, vehicle routing, timetabling, resource allocation, scheduling, geometric planning, among others. Thus, the techniques disclosed herein are not limited to RT recommender systems and can be applied to any type of system tuning and optimization where parameters can be learned from previous solutions.

In one aspect, a computer-implemented method for recommending an optimal configuration for a target system is provided. The method includes obtaining a plurality of samples, wherein each sample corresponds to a system configuration. The method includes extracting, from each of the plurality of samples, a plurality of features. The method includes grouping the plurality of samples into one or more clusters, wherein each cluster comprises a set of one or more samples. The method includes calculating, for each respective cluster of the one or more clusters, one or more metrics for each extracted feature based on the set of one or more samples in the respective cluster. The method includes calculating, for each respective cluster of the one or more clusters, a weight for each extracted feature based on the calculated one or more metrics for each extracted feature. The method includes obtaining a set of one or more requirements for a target system. The method includes determining an optimal configuration for the target system based on the calculated weights for each cluster and the set of one or more requirements.

In another aspect there is provided a device adapted to perform the method. In another aspect there is provided a computer program comprising instructions which when executed by processing circuitry of a device causes the device to perform the methods. In another aspect there is provided a carrier containing the computer program, where the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Embodiments disclosed herein enable the implementation of RT recommender systems that can be incorporated into a fully automatic end-to-end system that produces new RT solutions based on operator preferences extracted from previously deployed RT solutions. This potentially results in OPEX reduction by limiting RT solution variance among deployments for an operator.

Embodiments disclosed herein also enable the estimation of features that are difficult to quantify before deployment of new RT solutions.

The techniques disclosed herein are not limited to RT recommender systems and can be applied to any type of system tuning and optimization where parameters can be learned from previous solutions. According to some embodiments, operator preferences are extracted from previously deployed RT solutions and are applied to generate new RT solutions that match operator preferences. Aspects of the present disclosure combine machine learning and combinatorial optimization techniques. Aspects of the present disclosure are generic and thus can be applied to other problem domains.

Figure 1:
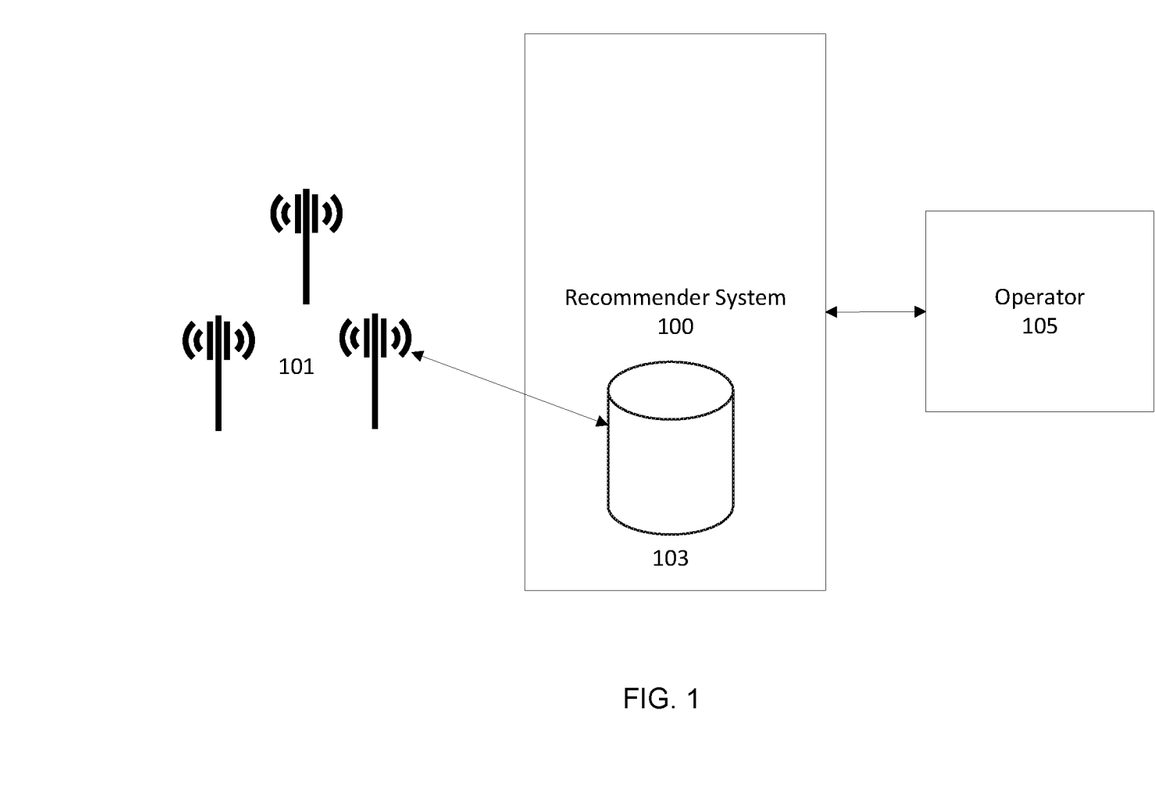
FIG. 1 is a block diagram according to some embodiments.

FIG. 1 is a block diagram according to some embodiments. FIG. 1 includes a recommender system 100, described in further detail below. Recommender system 100 is in electronic communication with a database 103. In some embodiments, database 103 may be co-located or housed within recommender system 100, and in other embodiments database 103 may be located externally to recommender system 100. Database 103 may comprise data relating to a plurality of RT solutions 101, and in some instances is in direct electronic communication with one or more RT solutions 101. An operator device 105, may be in electronic communication with recommender system 100 to operate recommender system 100 through one or more user interfaces, such as a graphical user interface. Operator device 105 may be a user device such as a computer, tablet, mobile device, or other user device.

Figure 2:
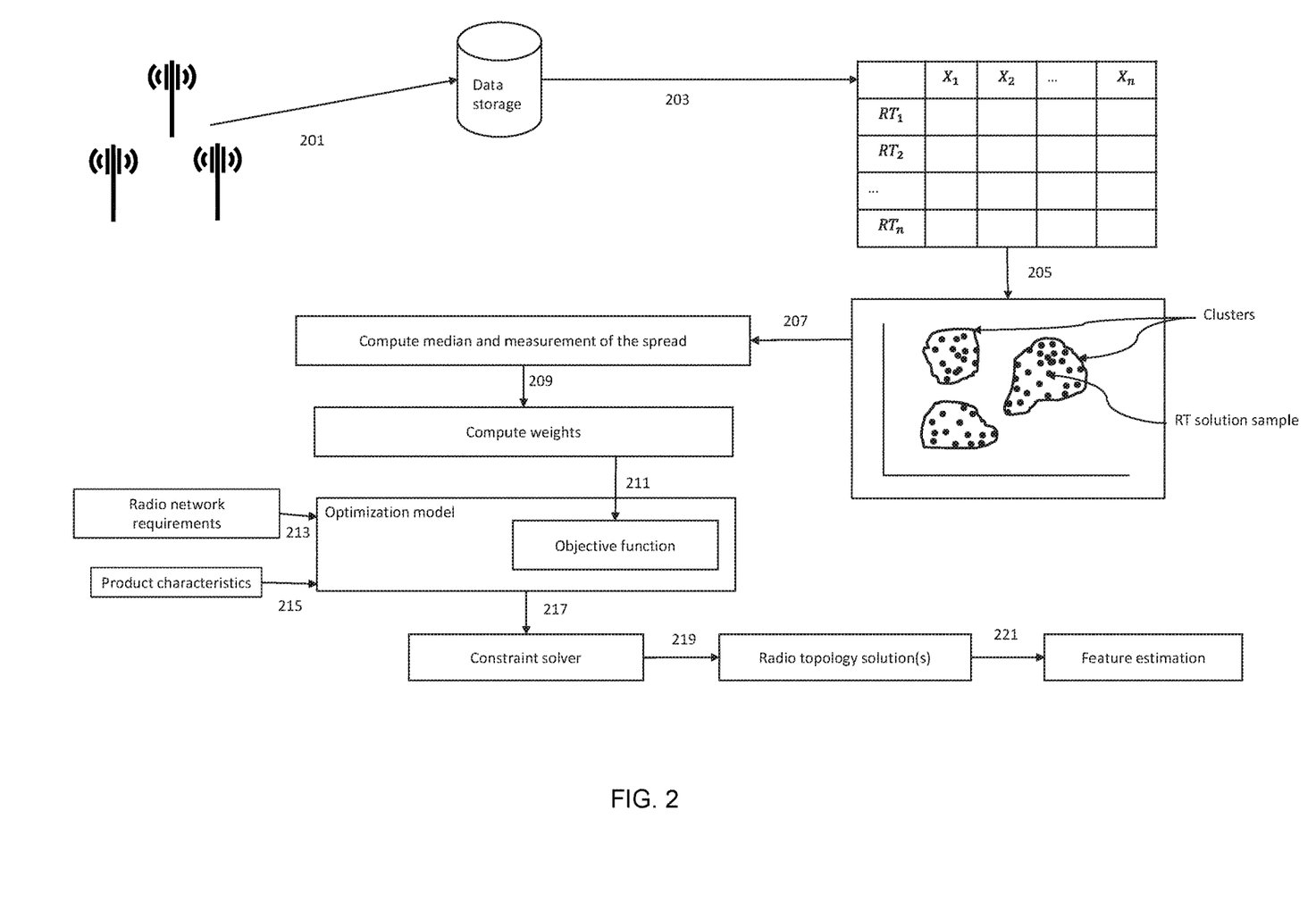
FIG. 2 is a flow diagram according to some embodiments.

FIG. 2 is a flow diagram according to some embodiments. In some embodiments, the recommender system 100 includes a weight computation system, optimization model and solving, and feature estimate as described in further detail below.

The weight computation system is created offline and consists of: data collection, feature extraction, clustering, median and spread computation, and weight computation.

At 201, data is collected from one or more RT solutions 101 and stored in database 103. This step consists of collecting data from deployed RT solutions 101 (one RT solution sample per site) with corresponding radio network requirements (e.g., cell configurations) and hardware product information from customer networks.

At 203, features are extracted from collected data for each RT solution sample. The extracted features can be grouped into two sets: (1) optimization feature set X and (2) estimation feature set $\tilde{X}$. The features in the optimization feature set X are used for computing the weights for the objective function in the optimization model described below. The features in the estimation feature set $\tilde{X}$ represent properties of RT solutions that may be difficult or infeasible to compute statically but can be measured once deployed, such as, for example, energy efficiency. These features may be used by the feature estimation system described below to provide an estimation of the features of the generated RT solution. In some embodiments, if a feature is correlated to the size of the RT solution, then the value for that feature should be normalized.

The extracted features may include configuration management (CM) data, such as a number of different baseband types, a number of links for a baseband unit, a number of cascaded radio units. The extracted features may include information on a deployment scenario, such as rural, sub-rural, urban, dense-urban, stadium, highway, indoor, small cell, coverage site, macro site, high-rise, or hotspot. The extracted features may include performance measurements, such as energy consumption, capacity, or peak throughput. The extracted features may include cost indicators, such as operators CAPEX/OPEX. These listed extracted features are not exhaustive, and a person of ordinary skill would appreciate that additional or different features may be extracted.

At 205, RT solutions are clustered. In order to capture underlying differences in operators' preferences, which can for example represent different deployment scenarios (e.g., urban sites, rural sites, etc.), RT solutions are grouped into a set of clusters. In this context, clustering is the task of grouping a set of RT solution samples in such a way that RT solution samples in the same group (called a cluster) are more similar to each other than to those in other groups (clusters). In some embodiments, the clustering can be done manually, such as based on input from operator 105. In some embodiments, the clustering can also be done automatically using (typically but not limited to) machine learning techniques, e.g. k-means clustering (Reference [3]), mean-shift clustering (Reference [4]), and density-based spatial clustering of applications with noise (DBSCAN) (Reference [5]). Automated clustering may be done using the extracted features, or a subset thereof, or some other data.

At 207, median and measurement of the spread is computed for each cluster. Namely, for each cluster C and for each feature $X_i \in X$, compute median $m_{C,i}$ and measurement of the spread $s_{C,i}$ between values. In some embodiments, a different measurement of a centroid is used, such as a mean, instead of a median value. In addition, measurement of the spread is a statistical metric that describes how similar or varied the set of observed values are among each other. In some embodiments, the spread may be calculated as, for example, variance and standard deviation.

At 209, weights are computed for each cluster. In some embodiments, for each cluster C and for each feature $X_i \in X$, weight $w_{C,i}$ is computed such that it is inversely proportional to the measurement of the spread $s_{C,i}$. In some embodiments, weight $w_{C,i}$ is computed such that it is proportional to the measurement of the centroid, e.g., median $m_{C,i}$. In some embodiments, for practicality, the result should be capped to avoid excessively large weights.

In some embodiments, an optimization model system and solver may be used.

At 211, the optimization model system consists of a set of constraints that every valid RT solution sample must fulfill and an objective function to minimize.

The constraints may include: (i) at 213, radio network configuration which describes the sets of baseband and radio units that should be included in the RT solution sample as well as the radio network planning (i.e., cell configuration), and (ii) at 215, product characteristics which describe the property of each of the baseband and radio units included in the radio network configuration at 213.

The objective function $f$ may be a sum of the weighted values $x_i$ for each feature $X_i \in X$ in a given cluster C:

$$f_C = \sum_i |x_i - m_{C,i}| * w_{C,i}$$

In addition, it is possible to adjust the objective function to include minimization of specific features by replacing $|x_i - m_{C,i}|$ with $x_i$.

At 217, in order to generate an optimal RT solution, the optimization model is given to a constraint solver that solves the model by fulfilling the constraints with goal to minimize the objective function.

At 219, for a new deployment, the constraint solver generates, for each cluster C, an RT solution based on the learned weights $w_{C,i}$. The resulting RT solutions can be sorted by the recommender system 100 before presenting them to the operator 105, in order of, for instance but not limited to, cluster density (i.e., showing the RT solution obtained that used the objective function of the cluster with largest number of RT solution samples as the first recommended solution).

At 221, certain features may be estimated. As described above, there may be features (denoted X) that are difficult or infeasible to compute statically but can be measured once deployed. One such feature may include, for example, energy efficiency. After generating a new RT solution S based on the learned weights from a given cluster C, the features $X_i \in \tilde{X}$ can be estimated for S based on the features measured for the solutions within C.

An estimate of a value for $X_i \in \tilde{X}$, can be computed using several methods. As described herein, rt is be used to denote a RT solution sample and $x_{rt,i}$ is used to denote the value of feature $X_i$ in the RT solution rt. A few examples for computing a feature estimation are shown below.

1. Take the range $[x_i^{min}, x_i^{max}]$, where $x_i^{min} = \min\{x_{rt,i}: rt \in C\}$ and $x_i^{max} = \max\{x_{rt,i}: rt \in C\}$.
2. Take the average, i.e., $$\frac{1}{|C|} \sum_{rt \in C} x_{rt,i}.$$

3. Find the RT solution $rt \in C$ that is closest to S and take $x_{rt,i}$.

These examples are not exhaustive, and a person of ordinary skill would recognize that additional methods exist that are not described herein.

Illustrative Example

Figure 3A:
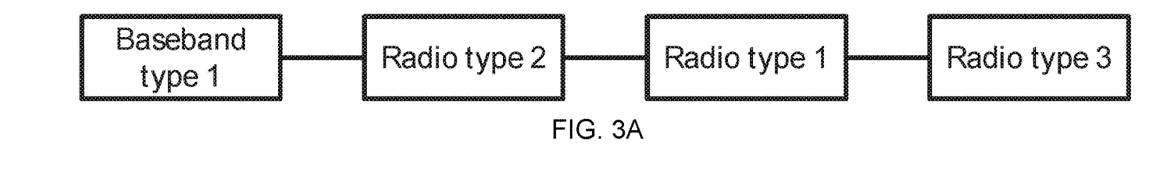
FIGS. 3A-3E are block diagrams of radio topology solutions, according to some embodiments.
Figure 3B:
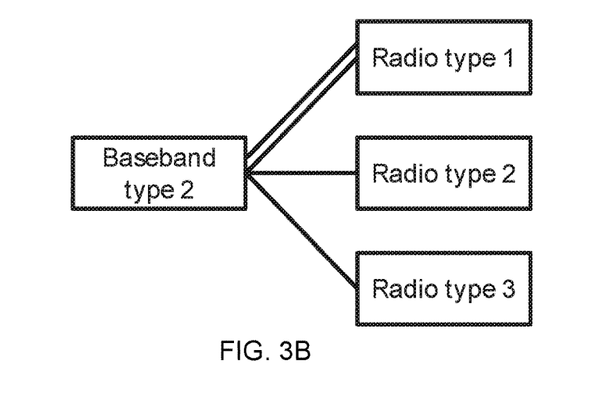
Figure 3C:
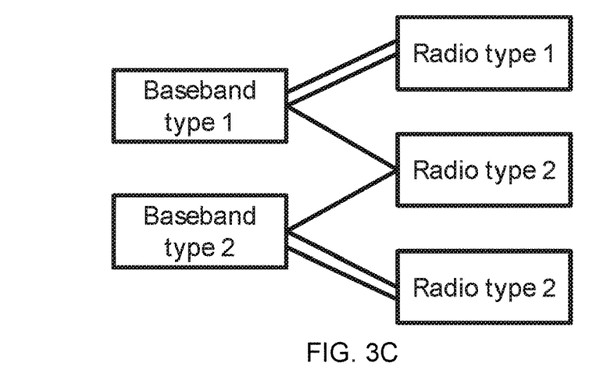
Figure 3D:
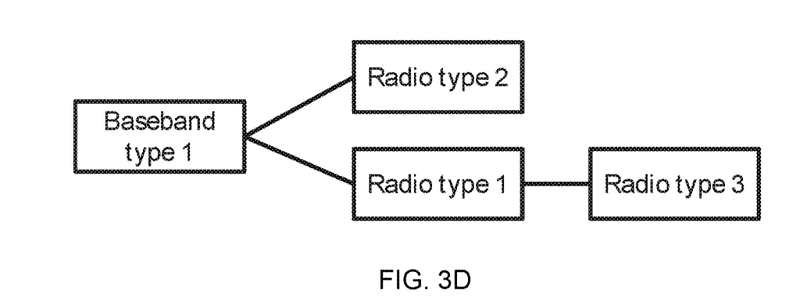
Figure 3E:
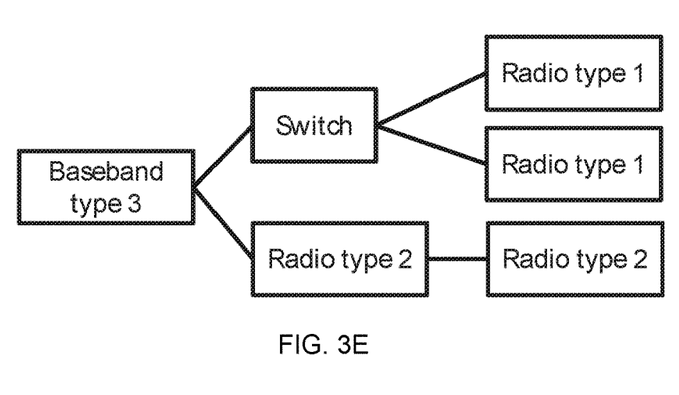

FIGS. 3A-3E are block diagrams of radio topology solutions, according to some embodiments. FIGS. 3A-3E illustrate a simple operator network with five sites. The RT solution of site 1, called RT 1, is shown in FIG. 3A, RT 2 is shown in FIG. 3B, RT 3 is shown in in FIG. 3C, RT 4 is shown in FIG. 3D, and RT 5 is shown in FIG. 3E. A solid line connecting a baseband and a radio unit represents a link. There could be one or several links between a baseband and a radio unit depending on capacity needs. Switches can be used as well between the baseband and radio units as shown in FIG. 3E.

In practice, the RT solutions can be much larger in terms of number of baseband and/or radio units connected in various ways. Where RT solution samples are collected per site, the number of RT samples collected from an operator's network is expected to be large.

As described above in connection with FIG. 2, RT solution information is collected from each site 1-5 shown in FIGS. 3A-3E.

For feature extraction, in the example the optimization feature set X is assumed to consist of: number of different baseband types, number of links going out/in of a baseband unit (normalized by the number of radio units) (the links between 2 radio units, or a radio unit and a switch are not included), and number of cascaded radio units (normalized by the number of radio units). In practice, the optimization model can include more features.

In addition, it may be assumed that the estimation feature set $\tilde{X}$ consists of the amount of energy consumed (in watt-hour) by a given RT solution, normalized by the number of units. As a result of the feature extraction step described above, we obtain the following shown in Table 1 below:

TABLE 1

|  | $X_1$ = No. diff. baseband types | $X_2$ = No. links (normalized) | $X_3$ = No. cascaded radio units (normalized) | $\tilde{X}_1$ = Energy consumption |
|---|---|---|---|---|
| RT 1 | 1 | $\frac{1}{3}$ | $\frac{2}{3}$ | $\frac{200}{4}$ |
| RT 2 | 1 | $\frac{4}{3}$ | 0 | $\frac{220}{4}$ |
| RT 3 | 2 | $\frac{6}{3}$ | 0 | $\frac{300}{5}$ |
| RT 4 | 1 | $\frac{2}{3}$ | $\frac{1}{3}$ | $\frac{200}{4}$ |
| RT 5 | 1 | $\frac{2}{4}$ | $\frac{1}{4}$ | $\frac{450}{6}$ |

For illustrative purposes and to convey the concept, it is assumed that, as a result of the clustering, two clusters are obtained as follows: (1) RT 1, RT 4, and RT 5 in Cluster 1, and (2) RT 2 and RT 3 in Cluster 2.

The computed median and spread for each feature would be as follows in Table 2 below:

TABLE 2

|  |  | $X_1$ | $X_2$ | $X_3$ |
|---|---|---|---|---|
| Cluster 1 | Median | 1 | 0.5 | .333 |
|  | Spread (std dev) | 0 | 0.136 | 0.180 |
| Cluster 2 | Median | 1.5 | 1.666 | 0 |
|  | Spread (std dev) | 0.5 | 0.333 | 0 |

The weight for each feature accordingly may be computed as follows as shown in Table 3 below, capped to 1000 as maximum value for illustrative purposes:

TABLE 3

|  | $X_1$ | $X_2$ | $X_3$ |
|---|---|---|---|
| Cluster 1 Weights | $\frac{1}{0} = \infty \to 1000$ | $\frac{1}{0.136} = 7.35$ | $\frac{1}{0.180} = 5.56$ |
| Cluster 2 Weights | $\frac{1}{0.5} = 2$ | $\frac{1}{0.333} = 3$ | $\frac{1}{0} = \infty \to 1000$ |

From the weights computed above, one can infer that in Cluster 1 it is most important (based on the given RTs) to avoid having different baseband types as that will incur the highest cost. It is second-most important in Cluster 1 to avoid deviating from the normalized number of links, and least important to deviate from the number of cascaded radio units.

In Cluster 2, one can infer that the number of cascaded radio units is most important as it will incur the highest cost, the second-most important is the normalized number of links, and the least important is the number of different baseband types.

In this example, a new deployment is needed for a site 6 with radio network requirements as follows: (i) 6 cells each with baseband processing demand 2.4 Gbps, channel bandwidth demand 10 MHz, and link throughput demand 2.4 Gbps; (ii) 3 cells each with baseband processing demand 3 Gbps, channel bandwidth demand 100 MHz, and link throughput demand 3 Gbps; (iii) 6 cells each with baseband processing demand 320 Mbps, channel bandwidth demand 20 MHz, and link throughput demand 320 Mbps.

In addition, the following product characteristics are needed for site 6: (i) 1 baseband unit of type 3, with a baseband processing capacity of 100 Gbps; (ii) 2 radio units of type 2, with a channel bandwidth capacity of 400 MHz; and (iii) links with throughput capacity of 30 Gbps.

The optimization model takes as input the radio network requirements and product characteristics as well as the computed weights of objective function $f$, where $f$ is one of the following objective functions which we derived based on the calculated weights in the previous steps:

$$f_1 = 1000 * |x_1 - 1| + 7.35 * |x_2 - 0.5| + 5.56 * |x_3 - .333|$$

$$f_2 = 2 * |x_1 - 1.5| + 3 * |x_2 - 1.666| + 1000 * |x_3 - 0|$$

The following is an example of a realization of the optimization model for this example:

minimize f subject to $\forall b \in B$: baseband processing capacity of $b \geq \sum_{\substack{n \in N \\ B_n = b}}$ baseband processing demand of n $\forall r \in R$: channel bandwidth capacity of $r \geq \sum_{\substack{n \in N \\ R_n = r}}$ channel bandwidth demand of n $\forall n \in N$: there must exist a path between $B_n$ and $R_n$
$\forall u, v \in B \cup R$: throughput capacity of links between u and v $\geq \sum_{\substack{n \in N \\ n \text{ uses link} \\ \text{between } u \text{ and } v}}$ link throughput demand of n where
N = set of cells in radio network requirements
B = set of baseband units selected from given product characteristics
R = set of radio units selected from given product characteristics
$L_{u,v}$ = set of links between units u and v
$B_n$ = baseband unit to which cell n ∈ N is allocated
$R_n$ = radio unit to which cell n ∈ N is allocated
$x_1$ = |distinct types in B|

$$x_2 = \frac{\sum_{\substack{b \in B \\ r \in R}} |L_{b,r}|}{|R|}$$

$$x_3 = \frac{\sum_{\substack{r_1, r_2 \in R \\ r_1 < r_2 \\ |L_{r_1, r_2}| > 0}} 1}{|R|}$$

The optimization model is given to a constraint solver that generates RT solutions.

Figure 4A:
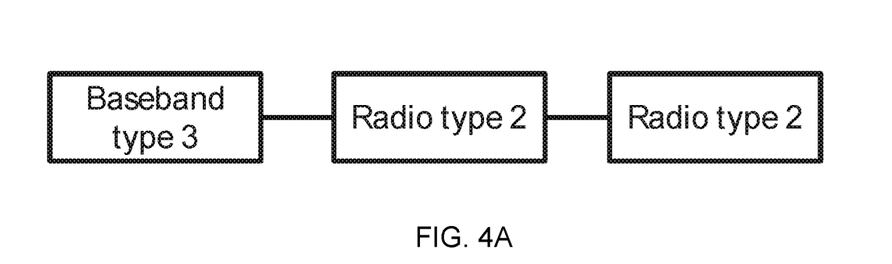
FIGS. 4A-4B are block diagrams of radio topology solutions, according to some embodiments.
Figure 4B:
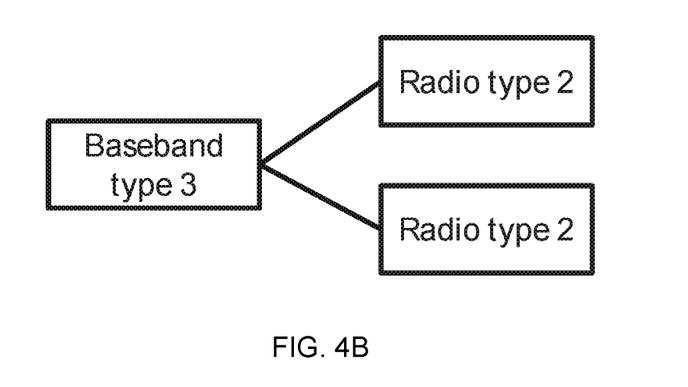

FIGS. 4A-4B are block diagrams of radio topology solutions that may be output by the constraint solver for this example. FIG. 4A illustrates RT 6₁ generated by minimizing objective function $f_1$. FIG. 4B illustrates RT 6₂ generated by minimizing objective function $f_2$.

Moreover, since there is more than one RT solution for the given deployment in this example, the RT solutions may be ordered before being presenting to the operator. In some embodiments, a sorting function may be used based on cluster density. Since Cluster 1 had 3 RT solution samples, RT 6₁ will be ranked highest because it was solved by minimizing the objective function $f_1$.

The estimated energy consumption for RT 6₁ and RT 6₂ can, for example, be calculated as the average of the normalized energy consumptions of the RT solutions samples in cluster 1 and cluster 2 respectively:

$$\tilde{X}_1^{RT6_1} = 3 * \frac{\left(\frac{200}{4} + \frac{200}{4} + \frac{450}{6}\right)}{3} = 175 \text{ Wh}$$

$$\tilde{X}_1^{RT6_2} = 3 * \frac{\left(\frac{220}{4} + \frac{300}{5}\right)}{2} = 172.5 \text{ Wh}$$

Figure 5:
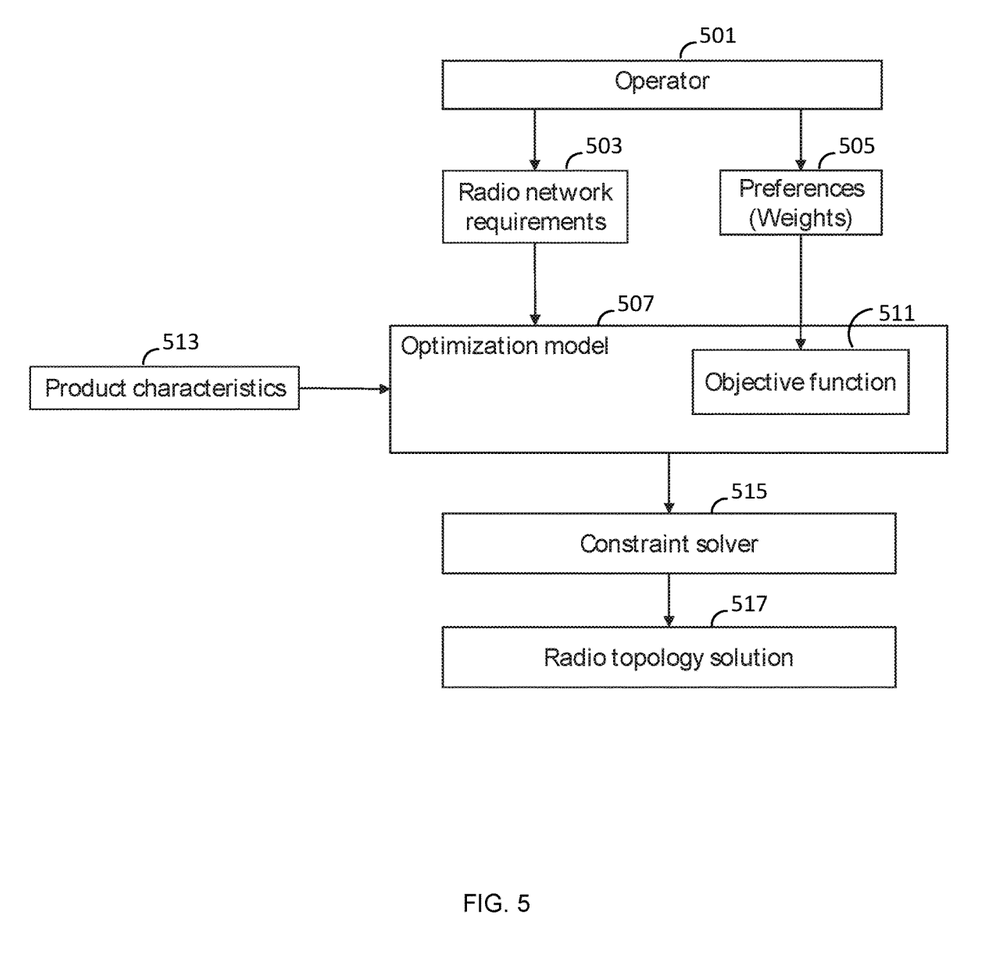
FIG. 5 is a block diagram according to some embodiments.

FIG. 5 is a block diagram according to some embodiments. Operator 501 provides radio network requirements 503 and preferences 505 to an optimization model 507. Product characteristics 513 may also be provided to the optimization model 507. The optimization model may include an objective function 511, and the optimization model 507 is provided to a constraint solver 515. The constraint solver 515 may output one or more radio topology solutions 517.

Figure 6:
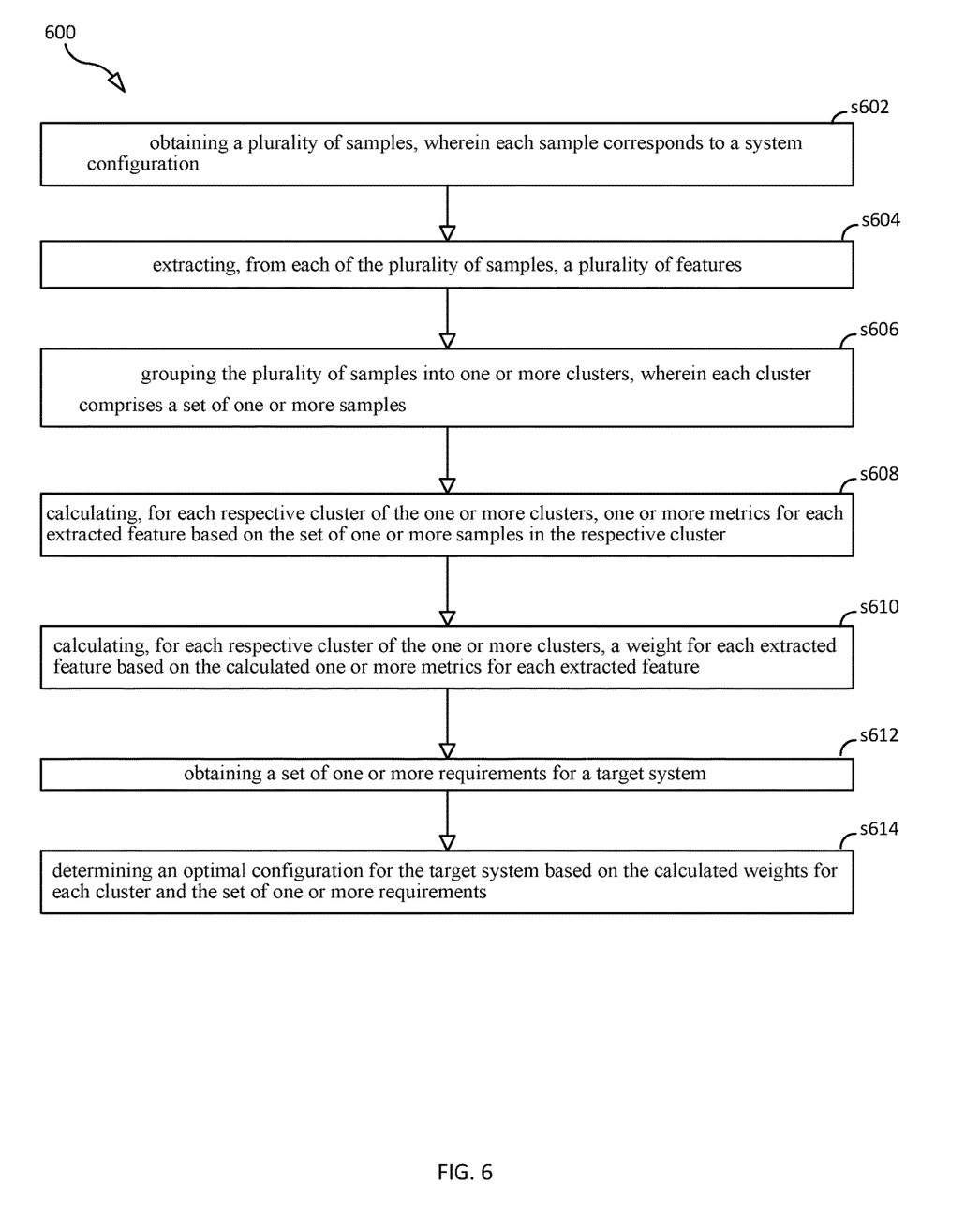
FIG. 6 illustrates a method according to some embodiments.

FIG. 6 illustrates a method according to some embodiments. FIG. 6 illustrates a computer-implemented method 600 for recommending an optimal configuration for a target system. In some embodiments, method 600 may be performed by recommender system 100.

At step s602, the method includes obtaining a plurality of samples, wherein each sample corresponds to a system configuration.

At step s604, the method includes extracting, from each of the plurality of samples, a plurality of features.

At step s606, the method includes grouping the plurality of samples into one or more clusters, wherein each cluster comprises a set of one or more samples.

At step s608, the method includes calculating, for each respective cluster of the one or more clusters, one or more metrics for each extracted feature based on the set of one or more samples in the respective cluster.

At step s610, the method includes calculating, for each respective cluster of the one or more clusters, a weight for each extracted feature based on the calculated one or more metrics for each extracted feature.

At step s612, the method includes obtaining a set of one or more requirements for a target system.

At step s614, the method includes determining an optimal configuration for the target system based on the calculated weights for each cluster and the set of one or more requirements.

Figure 7:
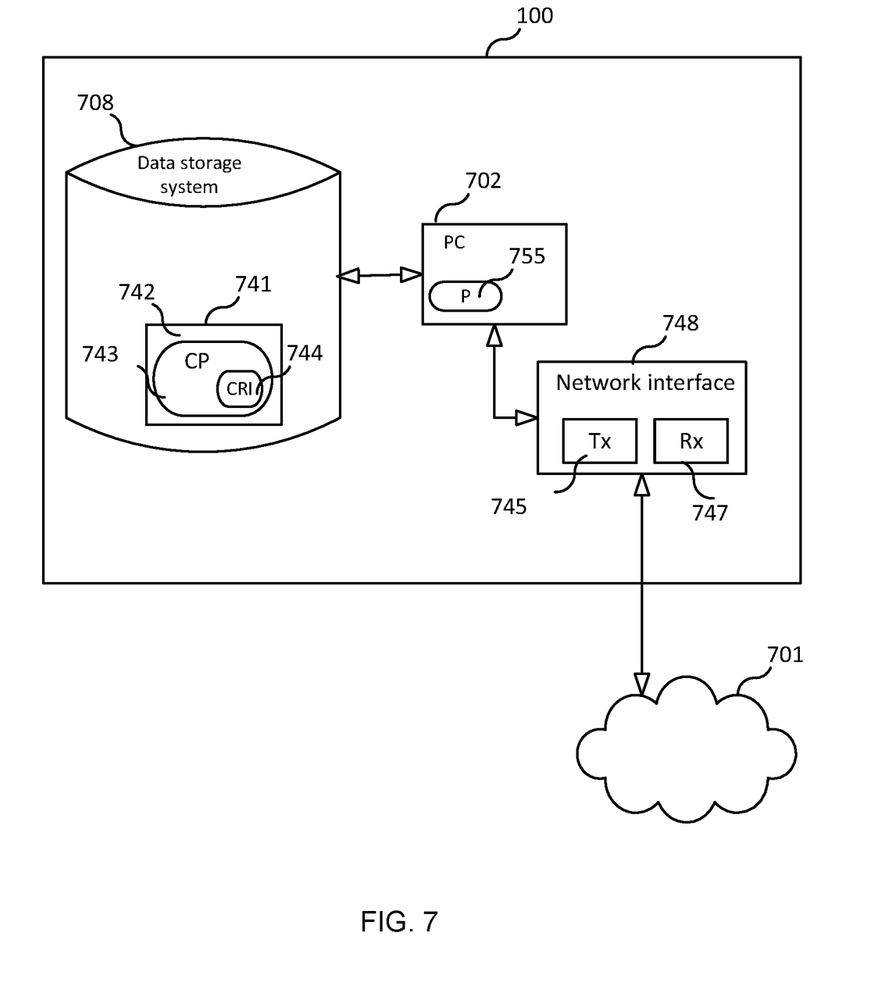
FIG. 7 is a block diagram of an apparatus according to some embodiments.

FIG. 7 is a block diagram of an apparatus 100 according to some embodiments. In some embodiments, apparatus 100 may comprise one or more of the components for recommender system 100 as described above. As shown in FIG. 7, apparatus 100 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, comprising a transmitter (Tx) 745 and a receiver (Rx) 747 for enabling apparatus 100 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes device 100 to perform steps described herein (e.g., steps described herein with reference to the flow charts). In other embodiments, device 100 may be configured to perform steps described herein without the need for code. That is, for example, PC 702 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

CAPEX Capital Expenses
OPEX Operation Expenses
MPC Model Predictive Control
RT Radio Topology

REFERENCES

[1] Weiner Wee, Riki Eto. Inverse model predictive control system, inverse model predictive control method, and inverse model predictive control program. Patent WO2019155511A1. 2018, Japan.
[2] Michele Lombardi, Michela Milano. Boosting Combinatorial Problem Modeling with Machine Learning. arXiv:1807.05517v1. 2018.
[3] Stuart P. Lloyd. "Least Square Quantization in PCM" (1982). IEEE Transactions on Information Theory. 28(2): 129-137.
[4] Keinosuke Fukunaga, Larry D. Hostetler. "The Estimation of the Gradient of a Density Function, with Applications in Pattern Recognition" (1975). IEEE Transactions on Information Theory. 21 (1): 32-40.
[5] Martin Ester, Hans-Peter Kriegel, Jörg Sander, Xiaowei Xu. A Density-based Algorithm for Discovering Clusters in Large Spatial Databases with Noise (1996). Proceedings of the 2nd International Conference on Knowledge Discovery and Data Mining (KDD-96). AAAI Press.

The invention claimed is:

1. A computer-implemented method for recommending an optimal configuration for a target system, the method comprising:
    obtaining a plurality of samples, wherein each sample corresponds to a system configuration;
    extracting, from each of the plurality of samples, a plurality of features;
    grouping the plurality of samples into one or more clusters, wherein each cluster comprises a set of one or more samples;
    calculating, for each respective cluster of the one or more clusters, one or more metrics for each extracted feature based on the set of one or more samples in the respective cluster;
    calculating, for each respective cluster of the one or more clusters, a weight for each extracted feature based on the calculated one or more metrics for each extracted feature;
    obtaining a set of one or more requirements for a target system; and
    determining an optimal configuration for the target system based on the calculated weights for each cluster and the set of one or more requirements.

2. The method of claim 1, wherein each sample comprises one or more baseband units, one or more radio units, and one or more interconnects, and wherein the optimal configuration is a radio topology configuration.

3. The method of claim 1, wherein the plurality of extracted features comprise a measurable property of a sample of the plurality of samples.

4. The method of claim 1, wherein the grouping comprises:
    automatically clustering the plurality of samples based on the plurality of extracted features.

5. The method of claim 4, wherein the automatically clustering is performed using a machine learning model.

6. The method of claim 1, wherein the one or more metrics comprise a centroid and a spread.

7. The method of claim 6, wherein the centroid is an average, mean, or median.

8. The method of claim 6, wherein the weight for a respective extracted feature $X_i$ for a cluster C is calculated using the following formula:

$$W_{C,i} = m_{C,i}/s_{C,i},$$

wherein $W_{C,i}$ is the calculated weight for the feature $X_i$ for cluster C, $m_{C,i}$ is the centroid for the feature $X_i$ for cluster C, and $S_{C,i}$, is the spread for the feature $X_i$ for cluster C.

9. The method of claim 1, further comprising:
defining the set of one or more requirements for the target system as constraints in an optimization model;
defining an objective function for each cluster based on the calculated weights for each extracted feature; and
providing the optimization model to a constraint solver that fulfils the defined constraints while minimizing the defined objective function for each cluster.

10. The method of claim 9, wherein the objective function ($f_C$) for a respective cluster C is calculated using the formula:

$$f_C = \sum_i |x_i| * w_{C,i}$$

wherein $x_i$ is a value of feature $X_i$, and $W_{C,i}$ is the calculated weight for the respective feature $X_i$ for the respective cluster C.

11. The method of claim 9, wherein the one or more metrics comprise a centroid, and the objective function ($f_C$) for a respective cluster C is calculated using the formula:

$$f_C = \sum_i |x_i - m_{C,i}| * w_{C,i}$$

wherein $x_i$ is a value of feature $X_i$, $m_{C,i}$ is the centroid for the respective feature $X_i$ for the respective cluster C, and $W_{C,i}$ is the calculated weight for the respective feature $X_i$ for the respective cluster C.

12. The method of claim 1, wherein the calculating the weight comprises capping the weight to a predetermined maximum value.

13. The method of claim 1, wherein the extracted plurality of features comprise at least one of: configuration management data, a deployment scenario, a performance measurement, or a cost indicator.

14. The method of claim 1, wherein the plurality of samples are grouped into a plurality of clusters and the method further comprises:
determining, for each respective cluster of the plurality of clusters, an optimal configuration using the calculated weights for the respective cluster; and
sorting the determined optimal configuration for each respective cluster.

15. The method of claim 14, wherein the sorting is performed according to a density of the respective cluster.

16. The method of claim 1, wherein the plurality of extracted features comprise at least one of an estimation feature from the plurality of samples, wherein the estimation feature comprises a live measurement taken from a respective sample in accordance with a corresponding system configuration for the respective sample.

17. The method of claim 16, wherein the determining the optimal configuration for the target system comprises:
calculating a value of the estimation feature of the optimal configuration based on a value of the extracted estimation feature for each cluster.

18. The method of claim 16, wherein the estimation feature comprises a live measurement of energy consumption.

19. A device adapted to perform method of claim 1.

20. A computer program comprising instructions which when executed by processing circuitry of a device causes the device to:
obtain a plurality of samples, wherein each sample corresponds to a system configuration;
extract, from each of the plurality of samples, a plurality of features;
group the plurality of samples into one or more clusters, wherein each cluster comprises a set of one or more samples;
calculate, for each respective cluster of the one or more clusters, one or more metrics for each extracted feature based on the set of one or more samples in the respective cluster;
calculate, for each respective cluster of the one or more clusters, a weight for each extracted feature based on the calculated one or more metrics for each extracted feature;
obtain a set of one or more requirements for a target system; and
determine an optimal configuration for the target system based on the calculated weights for each cluster and the set of one or more requirements.

* * * * *